INVENTORS
GEORGE WILLIAMS
GERARDO P. PALLANTE
BY

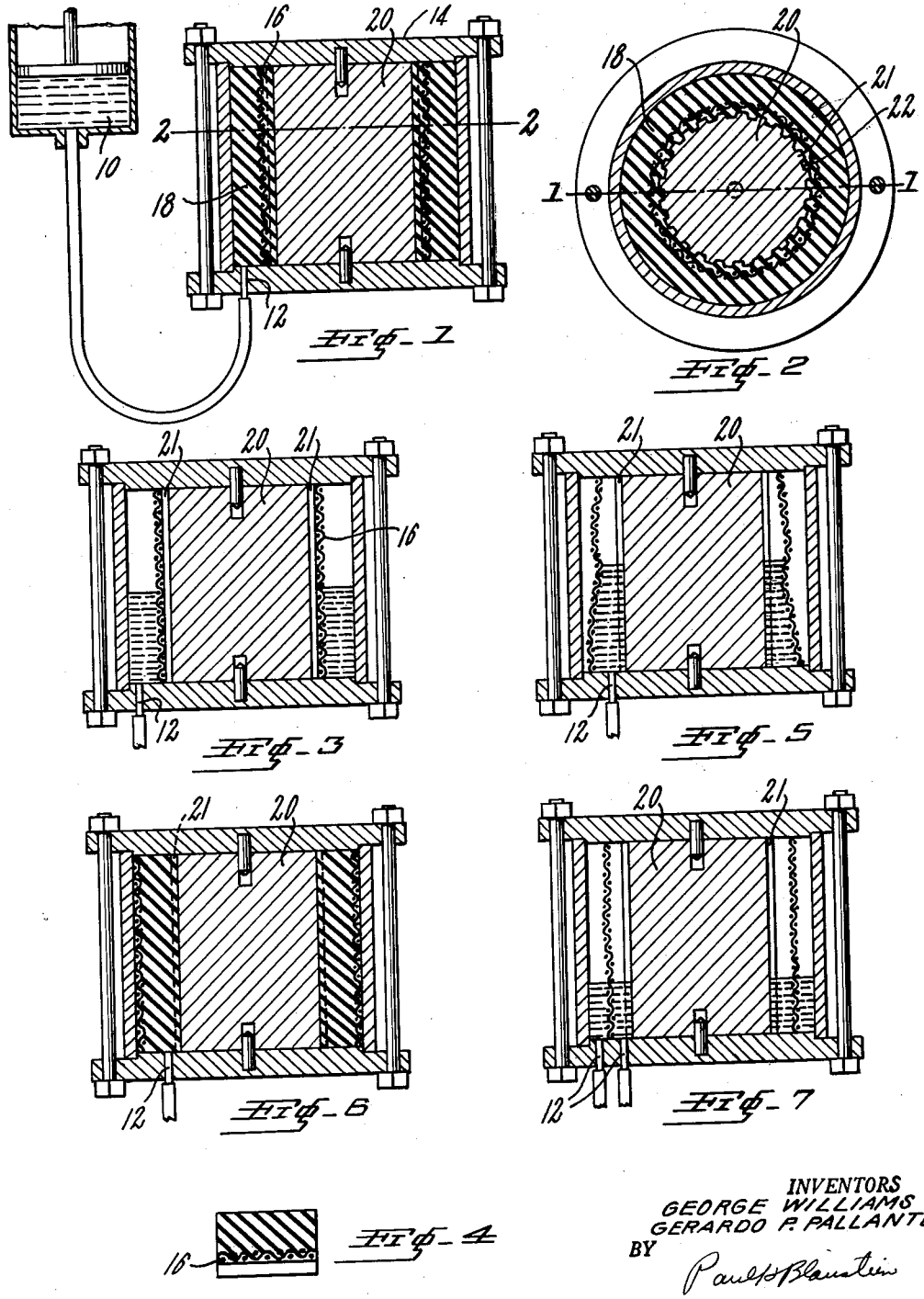

ATTORNEY

3,087,201
METHOD OF INJECTION MOLDING FABRIC-REINFORCED ARTICLES

George M. Williams, Glen Rock, and Gerardo P. Pallante, Newark, N.J., assignors to United States Rubber Company, New York, N.Y., a corporation of New Jersey
Filed Mar. 2, 1960, Ser. No. 12,414
3 Claims. (Cl. 18—59)

This invention is directed to a method of making a fabric-reinforced rubber article. More particularly, this invention relates to a novel method of positioning a fabric reinforcement in a mold cavity while injecting a fluid composition into the mold, and then curing the fluid composition to the rubbery elastomeric state.

The general concept of injection molding a rubbery material about a fabric reinforcement is old. However, prior art patents require the use of certain positioning means, such as studs, lugs, pegs, or pins in order to dispose the fabric-reinforcement in precise alignment in the mold cavity. A typical prior art patent requiring such positioning means is British Patent No. 744,907. The use of such positioning means results in obvious disadvantages, however, in that either the positioning means become an integral part of the finished product or else, if removed, the strength of the final product is impaired thereby.

Accordingly, it is an object of our invention to provide a method of injection-molding a fabric-reinforced elastomeric article wherein the fabric reinforcement is disposed within the mold cavity in the desired spatial position without the use of external positioning means.

Another object is to provide a method of controlling the viscosity of the liquid elastomeric material that is injected into the mold cavity and at the same time to precisely control the flowing properties of the elastomer with respect to the elastomer by coordinating this viscosity with the permeability or porosity, and "wettability" of the fabric used to reinforce the elastomer, so that any manner of complicated fabric-reinforced elastomeric articles can be formed with great precision. Wettability is the degree of wetting of a solid by a liquid measured by the adhesion between a solid and liquid phase.

Wettability is illustrated by the meniscus which is the curved upper surface of a liquid column, concave when the containing walls are wetted by a liquid such as water, and convex when they are wetted by a liquid such as mercury.

Additional objects will become apparent hereinafter.

Our invention will be better understood by reference to the accompanying drawing wherein:

FIG. 1 is a front view in partial section of a mold and fluid injector for use in my invention;

FIG. 2 is a top view of the mold taken along the line 2—2 of FIG. 1;

FIG. 3 is a front sectional view of the mold partially filled with fluid;

FIG. 4 is a section of a fabric-reinforced toothed belt made in accordance with my invention;

FIG. 5 is a front sectional view of the mold cavity partially filled with fluid and illustrates an alternative method of injecting the fluid;

FIG. 6 is a front sectional view showing the mold cavity completely filled by the alternative method of FIG. 5;

FIG. 7 is a front sectional view showing still another method of injecting fluid into the mold cavity;

Figure 8:
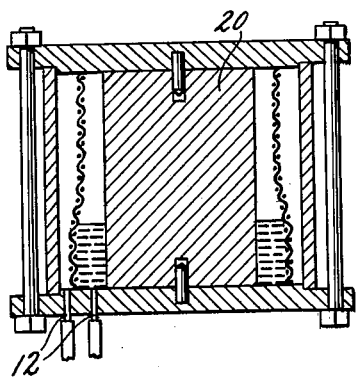
FIG. 8 is a front sectional view showing the mold cavity between the fabric and the central core partially filled with fluid.

The method of our invention may be carried out using any fluid that is capable of injection molding and also capable of being cured to the solid elastomeric state. Suitable elastomers include the liquid polyurethanes, vinyl plastisols, depolymerized rubber, latex, liquid phenolics and the epoxies, or the like.

Referring now to the figures, a suitable fluid 10 capable of being cured to the solid rubbery state is injected at an appropriately selected place 12 in the mold 14. By proper injection of the fluid 10 the fabric reinforcement 16 may be made to conform to virtually any desired position in the mold cavity 18. For example, suppose it is desired to make a toothed belt having textile reinforcement along the base or dedendum line of the teeth (FIG. 4). A toothed belt of this type is described in U.S. Patent No. 2,507,852 issued on May 16, 1950 to R. Y. Case. In such situation first the fabric reinforcement is prepared.

Such fabric may be in the form of cord fabric, woven fabric, or various combinations thereof, and in single or multiple plies. This fabric is disposed in cylindrical form in the mold cavity 18. The mold cavity 18 is in the form of the desired belt, in that the outer molding surface 21 of the core 20 contains indentations 22 into which the fluid 10 flows and subsequently cures and solidifies, thereby forming the teeth of the belt. When the mold cavity is formed on the outer surface of a mold or core, it is necessary for the fabric to be pressed inwardly towards the indentations 22. Also, the elastomeric material flows inwardly into these indentations.

The fluid 10 may be injected into the cavity 18 at a point 12 spaced radially outwardly of the fabric 16. As the fluid is injected into the cavity, it forces the fabric radially inwardly close to the indentations 22 and the projections 21 on the mold core 20 (FIG. 3). In this case, the fabric is constructed as a hollow cylinder (a tubular fabric) and has a diameter substantially equal to the outer diameter of the mold surface. The fluid is of sufficient viscosity that it will actually push the fabric alongside the mold core as the mold is filled. Only minute amounts of fluid will flow through the fabric interstices and between the fabric and the core. That minute portion of fluid which does flow through will flow into the core indentations 22 and form the belt teeth. When completely filled, the fabric reinforcement will essentially lie directly alongside the mold core 20 (FIG. 1). By controlling the diameter and porosity of the tubular fabric, and the wettability of the elastomeric material, the fabric can be located between .005–.010 inch from the dedendum line, the region of the belt between the fabric and the dedendum line being filled with the elastomeric material, the teeth are also formed by this "controlled leakage."

The fabric reinforcement need not necessarily be disposed along the inner portion of the mold, however. For example, if it is desired to position the fabric on the outer edge of the mold cavity, the opening 12 is spaced radially inwardly of the fabric (FIG. 5). The appearance of the mold in the half-full and full stages is that shown in FIGS. 5 and 6, respectively.

Figure 9:
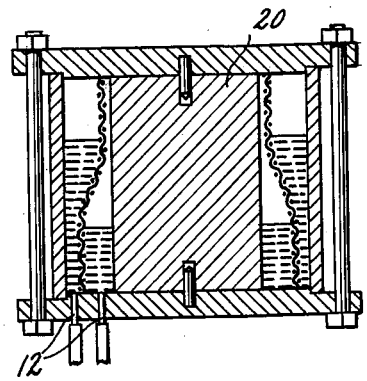
FIG. 9 is a front sectional view showing the same view as FIG. 8 with a portion of the mold cavity partially filled between the fabric and the outer portion of the mold.
Figure 10:
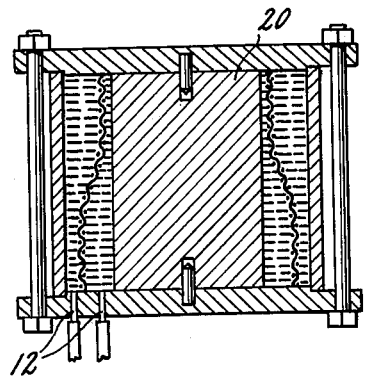
FIG. 10 is a front sectional view showing the mold of FIG. 8 and FIG. 9 completely filled.

In like manner, the fabric reinforcement can be caused to take up any desired intermediate position in the molded article. E.g., if the fabric is to be halfway between the inner core and outer shell, then fluid is injected on each side of the fabric, as shown in FIG. 7. The invention would also have application in making fabric reinforced rubber articles wherein the fabric could be guided into much more complex shapes, e.g. as where its profile would assume an S or cone shape intermediate the mold core and mold wall. FIGS. 8, 9 and 10 illustrate the formation of an S-shaped fabric within the molded elastomeric article. In FIG. 8 the fluid is injected between the fabric and the mold core 20 to a predetermined height. This forces the fabric outwardly in a uniform manner about the mold core 20. Fluid is then injected between the fabric and the mold wall to a height above that of the originally injected fluid. This forces the fabric inwardly above the level of the first fluid and maintains the fabric in this position. The mold is then completely filled with fluid and the fabric is maintained in a substantially S shaped position. It will be understood from this illustration that various levels of fluids can be used to obtain any selected shape for the fabric. This could be achieved by a suitable controlling and coordinating of the fluids viscosity and density with the mesh size, density, and wettability of the fabric.

Important factors involved in the proper exercise of our invention include (1) the viscosity of the injected fluid, (2) the porosity of the fabric, e.g. the size and number per unit area (the mesh) of the reinforcing fabric's interstices, which affects its permeability, (3) the wettability of the fabric. It is to be noted that the thickness of the fabric strands is one of the variables included in determining the size and number per unit area of reinforcing fabric interstices and is therefore included in the meaning of the term "porosity."

If the fluid to be used is a polyurethane, its viscosity can be varied within wide limits by comparatively small changes in temperature. E.g. a change of temperature from 30° to 130° C. will result in a shift in viscosity from 60,000 to 600 c.p.s. Accordingly, by determining the temperature-viscosity curve for a particular polyurethane (or other relevant elastomer), it is possible to utilize known temperature control means to accurately control the viscosity of the fluid.

The size of the fabric interstice or aperture is significant. We have found that this size may be varied within considerable limits, however an aperture of more than 0.250 by 0.250 inches is not satisfactory since the more known fluid urethanes are not offered sufficient resistance by the fabric to position the said fabric accurately in the mold. If the urethane is to be injected on both sides of the fabric (as shown in FIG. 7) there is no minimum limit on the size of the fabric interstice and the fabric may be almost impermeable.

It will be noted that if it is desired to position the fabric reinforcement primarily along one side of the mold only, then the injected fluid should be of sufficient viscosity that it will tend to travel along one side of the fabric and thereby push the fabric against the mold wall or core, rather than penetrate the fabric apertures and surround the fabric on both sides. Therefore, the aperture must be of sufficient smallness that the injecting fluid's flow therethrough will tend to be impeded. Conversely, if it is desired to position the fabric somewhere intermediate either the outer or inner mold wall or to cause the fabric to conform to a more complex configuration, as, for example, an S shaped profile rather than a straight line or vertical profile, then the aperture of the fabric is somewhat larger and the viscosity of the injected fluid can be reduced to such point that the fluid will have both an affinity to pass through the fabric apertures and also to travel alongside the fabric.

The "wettability" of the fabric (which is dependent upon the nature of the fabric surface) by the fluid is also a factor, for the more wettable the fabric, the more prone will be the elastomer to penetrate the fabric aperture rather than travel alongside it.

We can not, of course, set out all possible combinations of conditions as to elastomer viscosity and density, fabric porosity, permeability, wettability, and density. These conditions are readily determined, however, by limited experimentation.

The reinforcing fabric may be made of textile material but may equally well be made of the usual synthetic textiles, metal wire, like reinforcing strand material or other materials which will appear to be equivalents to those skilled in the art.

Particularly suitable for use as the fluid composition are the liquid polyurethanes. These polyurethane compositions are obtained by reacting a liquid alkyd resin with an organic diisocyanate. The polyurethane may be cured by means of a diamine curing agent, glycol, organic acid, by air or water or generally a hydrogen donor. The polyester alkyd is reacted with excess polyisocyanate. Frequently the polyisocyanate contains a primary diamine curing agent dispersed therein.

The liquid polyurethane prepolymer preferably employed is a reaction product of an organic polyisocyanate (typically a diisocyanate, although small amounts of a triisocyanate may also be used along with the diisocyanate) with a polyfunctional material. By way of non-limiting example, it may be mentioned purely for purposes of illustration that suitable polyisocyanates include polymethylene diisocyanates such as ethylene diisocyanate, hexamethylene diisocyanate and tetramethylene diisocyanate; alkylene diisocyanates such as propylene- 1,2-diisocyanate; cycloalkylene diisocyanates such as 1,4-diisoyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-diphenylmethane diisocyanate and phenylene diisocyanate,

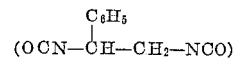

butane - 1,2,2-triisocyanate; triphenylmethane - 4,4'4"-triisocyanate; and polyisocyanates derived from corresponding substituted hydrocarbon radicals, such as monochlorobenzene-2,4,6-triisocyanate.

The polyfunctional material with which the foregoing or any other suitable diisocyanate is reacted to form the liquid prepolymer typically contains terminal hydroxyl groups and ordinarily has a molecular weight falling within the range of from about 300 to about 5000. Perhaps most frequently, such material may be a chain extended polyester made from a glycol, preferably a mixture of ethylene and propylene glycols, and a saturated organic dicarboxylic acid, preferably adipic acid. Usually the glycol contains from 4 to 20 carbon atoms, and the acid contains from 4 to 20 carbon atoms. An excess of the glycol over the acid is used in preparing the polyester, so that the resulting polyester contains terminal hydroxyl groups. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5000, and preferably from about 1500 to about 3000. In general the most suitable polyesters are chiefly linear in type with melting point levels of 90° C. or lower. Examples include polyethylene adipate, polyethylene adipatephthalate, polyneopentyl sebacate, as well as esters of such diols as propylene glycol; 1,3-propane diol; 1,4-butanediol, diethylene glycol and dipropylene glycol with such acids as succinic acid, glutaric acid, pimelic acid, suberic acid, azelaic acid, etc.

If desired, small amounts of tri-alcohols such as trimethylolpropane or trimethylolethane may be included in the preparation of the glycol-dicarboxylic acid polyester, and such modified forms of polyester are included within such terms as "polyester," or "glycol-dicarboxylic acid polyester" as used herein, that is when we describe the polyesters as reaction products of glycols with dicarboxylic acids, we do not intend to exclude the possibility that a small amount of a triol is also used.

As an alternative to the polyesters just described there may be used (for reaction with the diisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Such polyether may be linear, or it may be branched. Usually the polyethers used are chiefly linear in type with melting point levels of 90° C. or lower. The molecular weight may usually range from 500 to 5,000 (i.e., hydroxyl number of about 225 to 22), but is preferably within the range of 750 to 3,500 (i.e., hydroxyl number of about 150 to 45. Preferred polyethers may be represented by the formula H(OR)$n$OH where R is a lower (2–6 carbon atoms) alkylene group and $n$ is an integer such that the molecular weight falls within the range specified.

Polyethers not only can be used in place of polyesters, but can be used in conjunction with the polyesters, either as an added reagent or an intimate part of the polyester molecule in the form of a poly-ether-ester. Examples of such poly-ether-esters are poly diethylene glycol adipate and poly triethylene glycol adipate. The expressions "polyester" or "polyether" as used herein therefore include poly-ether-esters (whether the ethers and esters are physically mixed, or chemically combined) as equivalents of the polyesters or polyethers.

Further examples of polyesters or polyethers suitable for forming prepolymers useful in the invention are the polyesters and polyethers mentioned in U.S. Patents 2,606,162, Coffey, August 5, 1952; 2,801,990, Seeger, August 6, 1958; 2,801,648, Anderson, August 6, 1957; and 2,814,606, Stilmar, November 26, 1957. It is desired to emphasize that the invention contemplates the use of any and all such known polyethers or polyesters (including poly-ethers-esters) suitable for reaction with a diisocyanate to yield a polyurethane prepolymer capable of being cured to an elastic state by the action of a polyfunctional material such as a diamine or water.

In preparing the prepolymer, the polyester or polyether (including poly-ether-ester) is, as is too well known to require detailed elaboration here, reacted with a diisocyanate, using a considerable molar excess, commonly from a 20% to a 250% and preferably from a 50% to a 150% molar excess, of the diisocyanate over that amount which would be required to react with all of the alcholic groups furnished by the polyester. The reaction is frequently effected by mixing the polyester or the like and the diisocyanate under anhydrous conditions at room temperature, or at a moderately elevated temperature, e.g. 70–150° C., to form a soluble (in methyl ethyl ketone), uncured, liquid prepolymer which is polyurethane having terminal isocyanate groups. Any such conventional prepolymers may be utilized in the method of our invention.

Preferably, a primary diamine type of curing agent is dispersed in with the prepolymer. The use of a diamine curing agent dispersed in the prepolymer may be as described in the application of Graham et al., Serial No. 755,380, filed August 18, 1958, and the application of Varvaro, Serial No. 755,866, filed August 19, 1958, now Patent No. 3,004,939.

It will be understood that in addition to the polyurethane systems described in detail above, other liquid elastomer systems are also applicable. Particularly, we contemplate the use of vinyl plastisols.

The following discussion illustrates a particular method for practicing the invention. First a tension member is selected which may be composed of nylon, rayon, cotton. This fabric may be knitted and a light-weight nylon known as "Fiberthin" was satisfactory. This fabric, more particularly is the No. 1130 "Fiberthin," the specification of which is .0097″–.010″; nominal 503 weight, 20½ by 22½ count; strength 320–390 lbs.; air permeability of 87, warp and fill are 840 denier nylon. Second, the fabric's wettability is determined and controlled by treatment with a wetting agent such as water vapor, or the glycols. The wettability may be decreased by treatment with anti-wetting agents such as the silicones. Third, a urethane having a predetermined viscosity is selected. With the above fabric, a viscosity of 550 cps. at 100° C. was selected and 100 parts of a urethane known as Adiprene L was mixed with 11 parts of 4,4′ methylene-bis 2-chloroaniline. Adiprene L is a reaction product of a polyisocyanate and polyether and is well known to the industry. The fabric is then positioned in a suitable mold and the injection operation commences.

It will be understood that the foregoing description and examples are given merely by way of illustration and not limitation.

Having thus described our invention, what we claim and desire to protect by Letters Patent is:

1. A method of making a fabric reinforced elastomeric article in which the fabric is embedded within said article comprising the steps of placing a preformed endless fabric around a central core within a cavity of a mold so that one edge of said fabric is supported by the base of said mold and the other edge of said fabric extends to a portion of said mold opposite said base, said fabric being unsupported intermediate its edges, injecting a first fluid into said cavity to a given level between said core and a portion of said fabric to thereby force said portion of said fabric to a position intermediate said core and an outer surface of said mold and to maintain said portion of said fabric in said position, injecting a second fluid into said cavity to a level above said first fluid at a position between a second portion of said fabric and said outer surface to thereby force the second portion of fabric relatively closer to said core than said first portion of fabric, filling the remainder of said cavity with said first and second fluids, and curing said fluids to the solid elastomeric state.

2. A method of making a fabric reinforced elastomer article in which the fabric is embedded within said article comprising the steps of placing an endless fabric around a central core within a cavity of a mold so that one edge of said endless fabric is supported by the base of said mold and the other edge of said fabric extends to a portion opposite the base of said mold, said fabric being unsupported intermediate its edges, injecting a first fluid between said fabric and said core and injecting a second fluid between said fabric and the outer surface of said mold to maintain said fabric by the pressure of said fluids at a point intermediate said core and said outer surface.

3. A method of making a fabric reinforced elastomeric article in which the fabric is embedded within said article comprising the steps of placing a preformed endless fabric around a central core within a cavity of a mold so that one edge of said endless fabric is supported by the base of said mold and the other edge of said fabric extends to a portion opposite the base of said mold, said fabric being unsupported intermediate its edges, injecting a first fluid between said fabric and said core and injecting a second fluid between said fabric and the outer surface of said mold, said fluids being injected at a constant rate so that said fabric is maintained by the pressure of said fluids at a point intermediate said core and said outer surface.

References Cited in the file of this patent

UNITED STATES PATENTS

| | | |
|---|---|---|
| 2,780,350 | Simon et al. | Feb. 5, 1957 |
| 2,841,205 | Bird | July 1, 1958 |
| 2,903,388 | Jonke et al. | Sept. 8, 1959 |
| 2,910,730 | Risch | Nov. 3, 1959 |
| 2,913,772 | Buchkremer et al. | Nov. 24, 1959 |
| 2,943,949 | Petry | July 5, 1960 |
| 2,993,233 | Hoppe et al. | July 25, 1961 |